(12) United States Patent
Sugiyama et al.

(10) Patent No.: US 8,095,347 B2
(45) Date of Patent: Jan. 10, 2012

(54) APPARATUS AND METHOD FOR ANALYZING AN ELECTRIC FIELD OR DISCHARGE IN A TRANSFER PROCESS

(75) Inventors: Asako Sugiyama, Yokohama (JP);
Toyoshige Sasaki, Yokohama (JP);
Takuma Onishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 12/247,414

(22) Filed: Oct. 8, 2008

(65) Prior Publication Data
US 2009/0112528 A1 Apr. 30, 2009

(30) Foreign Application Priority Data

Oct. 25, 2007 (JP) .................................. 2007-277585

(51) Int. Cl.
*G06G 7/48* (2006.01)
(52) U.S. Cl. ................................. 703/7; 399/1
(58) Field of Classification Search .................. 703/1, 2, 703/7
See application file for complete search history.

(56) References Cited

U.S. PATENT DOCUMENTS

| 2004/0167759 A1* | 8/2004 | Kawakami ......................... 703/6 |
| 2005/0084287 A1* | 4/2005 | Niimi et al. .................... 399/111 |
| 2005/0276616 A1* | 12/2005 | Sasaki et al. ....................... 399/1 |

FOREIGN PATENT DOCUMENTS

JP 2004-138891 A 5/2004

OTHER PUBLICATIONS

Nakayama et al, "Numerical Study on Sticking of Paper in Electrostatic Transfer Process for Electrophotography", International Journal of Applied Electromagnetics and Mechanics, 13, 2001/2002, pp. 65-70.*
Butler et al, "A Model for Space Charge Evolution and Charge Deposition in the Electrophotographic Toner Transfer Process", IEEE Transactions on Industry Applications, vol. 27, No. 6, Nov./Dec. 1991.*
Cassidy et al, "Modelling Dielectric Heterogeneity in Electrophotography", Modelling and Simulation in Materials Science and Engineering, 12, 2004, pp. 91-107.*
Ito et al, "Numerical Simulation of Biased Roller Transfer by One-Dimensional Quasi-Steady Electric Field Analysis", International Journal of Applied Electromagnetics and Mechanics, 13, 2001/2002, pp. 85-92.*
Katakura et al, "Simulation of Electrophotographic Process", OKI Technical Review, vol. 64, Aug. 1998.*

* cited by examiner

*Primary Examiner* — Mary C Jacob
(74) *Attorney, Agent, or Firm* — Canon USA Inc IP Division

(57) ABSTRACT

An area in which a model of a soft medium is moved is divided into a plurality of elements. In response to an update of simulation time, parameters about the model of the soft medium are shifted to elements at a position to which the soft medium is to be conveyed. After the parameters are shifted, the shape of the model of the soft medium is calculated. The elements need not be redivided by shifting the parameters to the elements at the position, to which the soft medium is to be conveyed.

17 Claims, 10 Drawing Sheets

| | IMAGE PRODUCED BY ACTUAL APPARATUS | ABNORMAL DISCHARGE BETWEEN TRANSFER BELT AND PAPER | |
|---|---|---|---|
| | | KNOWN METHOD | EXEMPLARY EMBODIMENT |
| A | SATISFACTORY | NO | NO |
| B | UNSATISFACTORY | NO | YES | ns
APPARATUS AND METHOD FOR ANALYZING AN ELECTRIC FIELD OR DISCHARGE IN A TRANSFER PROCESS

BACKGROUND OF THE INVENTION

1. Field of the Invention

The present invention relates to an apparatus and a method for analyzing an electric field or discharge in a transfer process.

2. Description of the Related Art

Japanese Patent Laid-Open No. 2004-138891, discloses a method for analyzing an electric field or discharge in a charge process and a transfer process in an electrophotographic apparatus. In this method, a Poisson equation is solved, considering charge transfer in a conductor according to Ohm's law and gaseous discharge between a dielectric and a conductor according to Paschen's law, to calculate an electric field in a transfer process.

FIG. 3 shows a two-dimensional model of a transfer process to be analyzed for an electric field. The model shown in FIG. 3 shows a transfer roller 30, a core metal 31 of the transfer roller 30, a voltage 32, a counter roller 33, a transfer belt 34, a paper sheet 35, and a support roller 37.

In FIG. 3, the transfer roller 30 opposes the grounded counter roller 33. The transfer belt 34 and the paper sheet 35 are sandwiched between the transfer roller 30 and the counter roller 33 and pressed against each other. The pull angle of the upstream portion of the transfer belt 34 is adjusted by the support roller 37, and the downstream portion of the transfer belt 34 is wound around the counter roller 33.

In an actual apparatus, the positive voltage 32 is applied to the core metal 31 of the transfer roller 30 to transfer toner put on a surface of the transfer belt 34 on the side of the paper sheet 35. In this case, the transfer roller 30, the counter roller 33, the transfer belt 34, and the paper sheet 35 are rotated or moved from the right to the left in the direction of an arrow. The entrance side of a nip (the right of the nip) is called the upstream portion, and the exit portion of the nip (the left of the nip) is called the downstream portion.

FIG. 4 is an enlarged diagram showing a part that is surrounded by a broken line and includes the nip and the neighborhood in FIG. 3. A model in FIG. 4 includes air areas 36, resistive layers 38, and a minute gap 39. In electric field calculation, the resistive layers 38, which are nipped contact portions, need to be set up. Moreover, when electric field analysis in which toner is considered is performed, the minute gap 39 corresponding to the thickness of a toner layer needs to be set up between the transfer belt 34 and the paper sheet 35.

Parameters necessary for two-dimensional electric field analysis for such a transfer process apparatus include, for example, the conductivity and permittivity of each of the transfer roller 30, the transfer belt 34, the paper sheet 35, and the like, the amount of toner charge, and data on the shape of a nip at which these members are pressed against each other.

However, the following problem exists in the forgoing known analysis technique.

The same mesh model cannot be used in electric field calculation and structural calculation. This is because, in electric field calculation, resistive layers that are contact portions and a minute gap for a toner passage are necessary, but in structural calculation, these elements are not considered. This is also because respective analysis regions and necessary analysis accuracies in electric field calculation and structural calculation differ from each other. Moreover, when, in view of operations in a transfer process, in structural analysis, the movement of the leading end of a soft medium (paper), the movement changing every moment, is considered as the movement of a mesh, in electric field calculation, a mesh needs to be redivided for each time step. In electric field calculation in which resistive layers that are contact portions and a minute gap are considered, the process of redividing a mesh requires a great deal of calculation time.

These problems affect quantitative evaluation of image degradation, thereby significantly affecting the practical use of simulations.

SUMMARY OF THE INVENTION

In view of the foregoing problems, the present invention provides an apparatus and a method in which, in coupling calculation in electric field calculation and structural calculation in transfer process simulation, for example, electric field distribution and discharge can be readily analyzed, considering the deformation of members due to the electrostatic force.

An analysis apparatus according to an aspect of the present invention includes an element division unit configured to divide, into a plurality of elements, an area in which a model of a soft medium is moved, and a calculation unit configured to calculate a shape of the model of the soft medium in response to an update of simulation time. The calculation unit shifts parameters about the model of the soft medium to elements at a position to which the model of the soft medium is to be conveyed, out of the elements generated by the element division unit, and calculates the shape of the model of the soft medium at the simulation time after shifting the parameters.

Further features of the present invention will become apparent from the following description of exemplary embodiments with reference to the attached drawings.

DESCRIPTION OF THE EMBODIMENTS

Exemplary embodiments of the present invention will now be described.

In an exemplary embodiment, analysis (weak coupling calculation) in which electric field calculation and structural calculation that are different calculation processes are alternately performed is performed. Respective mesh models (models that are divided into finite elements) of a transfer process apparatus that transfers toner that is particles to a soft medium that is a model of paper are divided by different methods for dividing models into finite elements in electric field calculation and structural calculation.

Figure 5:
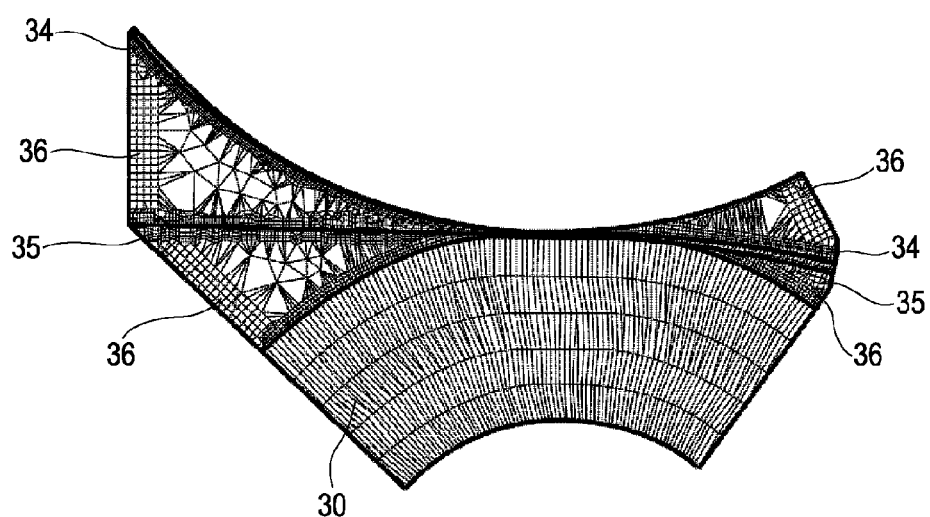
FIG. 5 shows a mesh model for electric field calculation of the transfer process apparatus.
Figure 6:
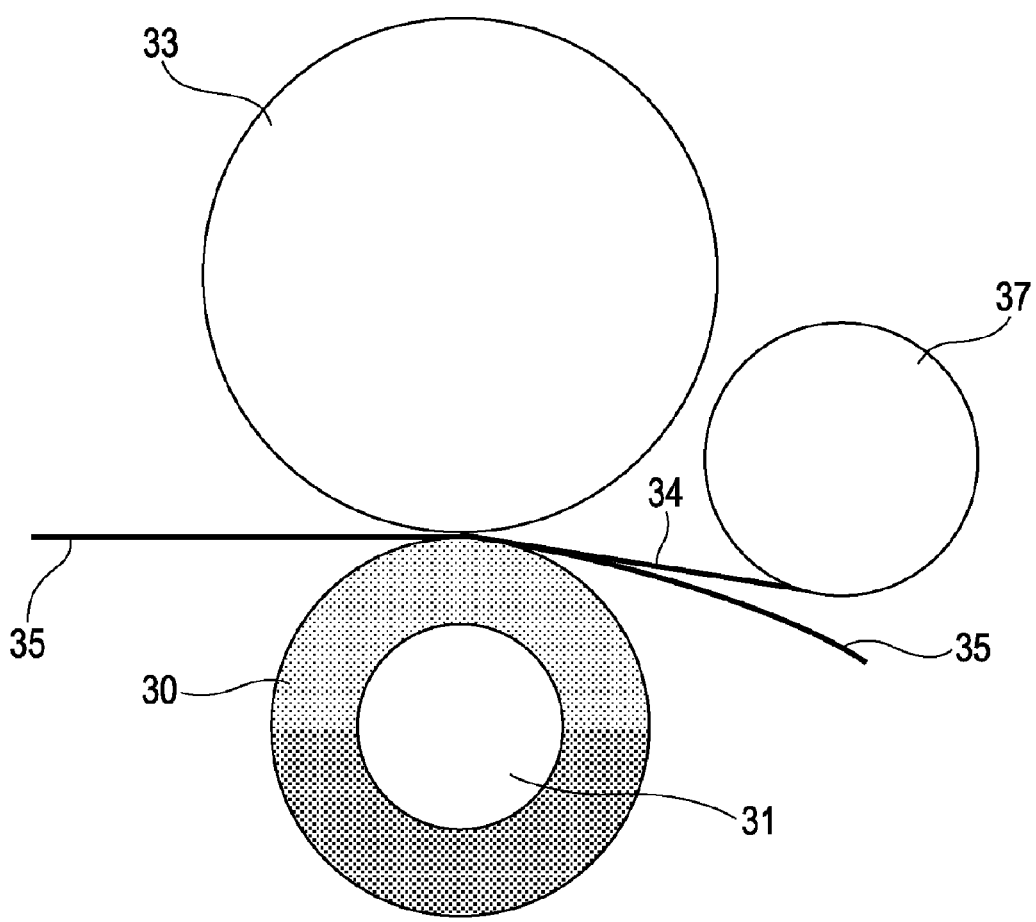
FIG. 6 shows a mesh model for structural calculation of the transfer process apparatus.

FIG. 5 shows a mesh model of a transfer process apparatus used in electric field calculation. FIG. 6 shows a mesh model of the transfer process apparatus used in structural calculation. In FIGS. 5 and 6, a model 30 represents a transfer roller, a model 31 represents the core metal of the transfer roller, a model 33 represents a counter roller, a model 34 represents a transfer belt, a model 35 represents a soft medium (paper), models 36 represent air areas, and a model 37 represents a support roller.

In the model of the transfer process apparatus used in electric field calculation, the model being divided into finite elements, shown in FIG. 5, a part that includes a nip between the counter roller model 33 and the transfer roller model 30 and the neighborhood of the nip is an area to be analyzed. The soft medium model 35 is sandwiched between the counter roller model 33 and the transfer roller model 30. The geometric shapes of the contours of members used in the model, which is divided into finite elements, used in electric field calculation are set so as to coincide with the geometric shapes of the contours of members used in the model, which is divided into finite elements, used in structural calculation. A mesh part of the paper model 35 is set across an area that is expected to be conveyed and needs to be analyzed. In this case, this area is set in advance by, for example, a mouse (not shown).

In the exemplary embodiment, when simulation time is updated, redivision of elements (mesh) in response to the movement of the paper model 35 in the conveying direction is not performed, but the value of charge that is parameter information is shifted. Mapping of information on the force of transferred charge from the model used in electric field calculation to the model used in structural calculation can be performed by this operation.

Respective methods for simulation of conveying paper in electric field calculation and structural calculation will now be described.

Figure 7:
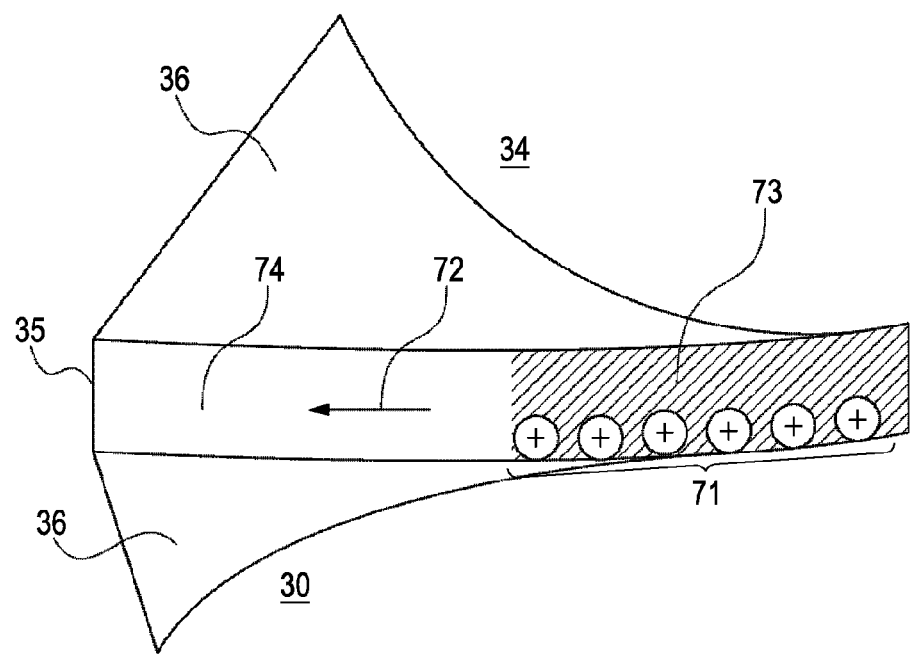
FIG. 7 shows the simulation of conveying paper in electric field calculation.

FIG. 7 shows the simulation of conveying paper in electric field calculation. In FIG. 7, solid lines represent the boundaries between individual member models of a transfer simulation apparatus in electric field calculation, and areas surrounded by solid lines represent areas to be analyzed.

In FIG. 7, models 71 represent charge carriers accumulated in paper by, for example, charge injection or discharge. An arrow 72 represents a direction in which the simulation of conveying a paper model is performed. A hatched area 73 represents an area that is handled as the paper model. An area 74 represents an area that is not handled as the paper model.

The simulation of conveying the paper model in electric field calculation is performed by shifting charge models 73 carried by paper in the direction of the arrow 72. Specifically, an analysis apparatus in the exemplary embodiment treats an area in which charge carriers exist, out of an area in which the simulation of conveying the paper model is performed, as the area 73, in which the paper model exists, as shown in FIG. 7. In other words, in the analysis apparatus in the exemplary embodiment, conveyance of the paper model is simulated by shifting the value of charge over time in response to an update of simulation time.

Figure 8:
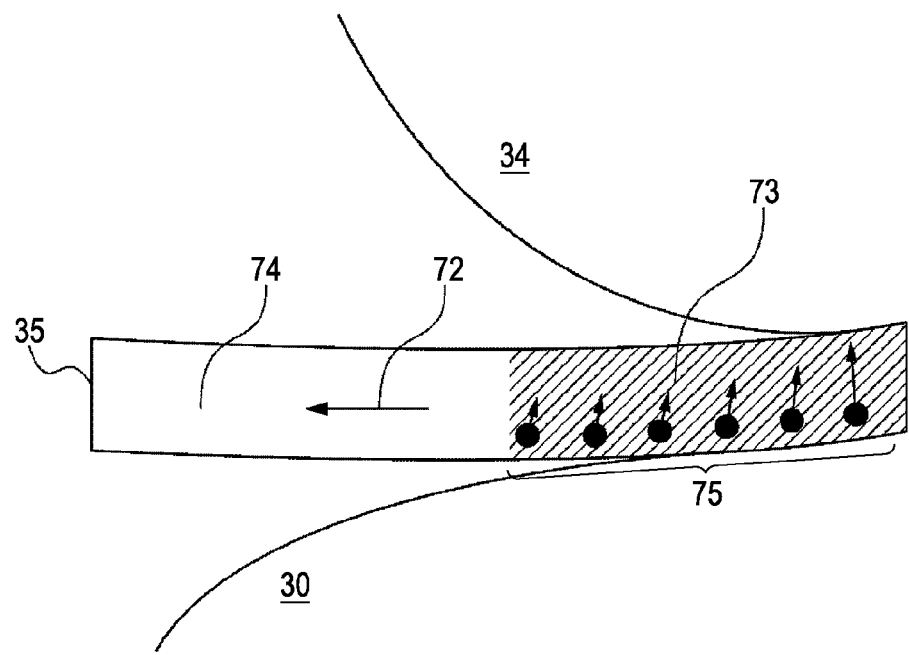
FIG. 8 shows the simulation of conveying a paper model in structural calculation.

FIG. 8 shows the simulation of conveying a paper model in structural calculation. In FIG. 8, solid lines represent the boundaries between individual models in structural calculation. Arrows 75 represent respective vectors of electrostatic forces produced by charge carriers transferred to individual positions in the paper model calculated from the result of electric field calculation.

In structural calculation in the exemplary embodiment, an area in which a paper model exists is defined by an area in which electrostatic forces exist. Specifically, in FIG. 8, the hatched area 73 is treated as the area 73, in which the paper model exists. The area of the electrostatic forces corresponding to the transferred charge carriers is shifted in the conveying direction for each time step. Conveyance of paper is expressed by this operation.

Figure 14:
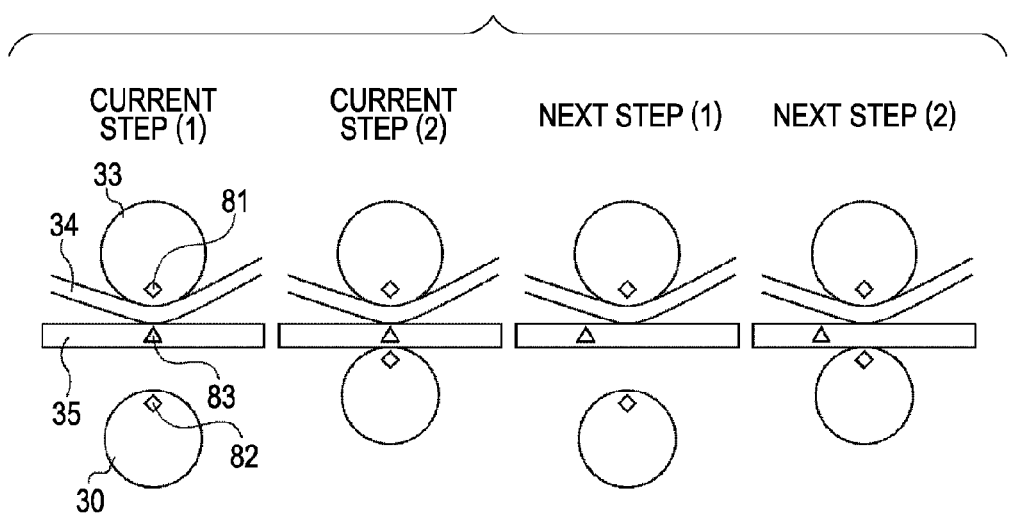
FIG. 14 shows a method for pressing a paper model in structural calculation.

FIG. 14 shows a method for pressing a paper model in structural calculation. In FIG. 14, since the models 30, 33, 34, and 35 are the same as those shown in FIG. 6, the description is omitted. An element 81 is an element on a pressing side of the counter roller model 33. An element 82 is an element on a pressing side of the transfer roller model 30. A position 83 represents the position of the leading end of the paper sheet 35. In the current step (1), the transfer roller model 30 is located at a position distant from the paper model 35. Subsequently, in the current step (2), the transfer roller model 30 is pressed against the counter roller model 33 by, in the direction toward the counter roller model 33, applying a specified load to the transfer roller model 30 or displacing the transfer roller model 30. Then, the deformation of the shape of the paper model 35 in the current step is calculated. Subsequently, when simulation time is updated, in the next step (1), the transfer roller model 30 is returned to the same position as in the current step (1), without the transfer roller model 30 being rotated, and only the position of the leading end of the paper model 35 is moved in the direction of the process. Subsequently, in the next step (2), the transfer roller model 30 is pressed against the counter roller model 33 by, in the direction toward the counter roller model 33, applying the specified load to the transfer roller model 30 or displacing the transfer roller model 30. Then, the deformation of the shape of the paper model 35 in the next step is calculated. This process is repeated at these time steps. In this way, the convergence of structural calculation is improved and mapping to the mesh model for electric field calculation can be performed by pressing the counter roller model 33 and the transfer roller 30, which actually rotate, against each other only by loading or displacement, without the counter roller model 33 and the transfer roller 30 being rotated.

Figure 13:
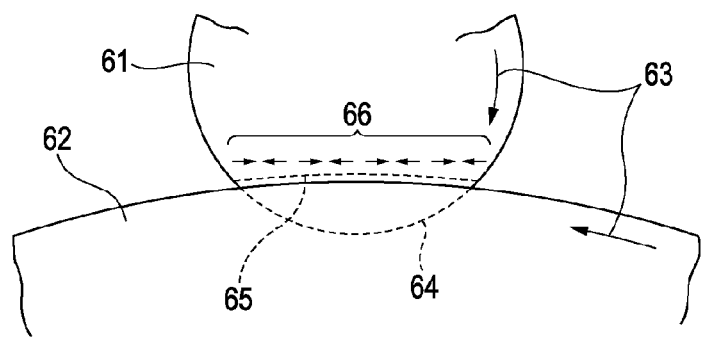
FIG. 13 is a diagram of a nip in a case where objects with different diameters are pressed against each other in a transfer process apparatus.

FIG. 13 is a diagram of a nip in a case where objects with different diameters are rotated with being pressed against each other. A roller 61 is a roller of a soft material with a smaller diameter. A roller 62 is a roller of a hard material with a larger diameter. An arrow 63 represents the rotation direction. An arc 64 represents a path on which the roller 61 would exist if the roller 61 was not pressed against the roller 62. An arc 65 represents a path on which the pressed roller 61 travels.

In-plane stresses 66 are in-plane stresses received by a surface of a nip of the pressed roller 61.

In such a transfer process apparatus model, the roller 61 is fixed on the central axis, and the roller 62 is pressed upward against the roller 61. Then, the roller 62 is rotated in the rotation direction indicated by the arrow 63, and the roller 61 is rotated by being caused to follow the roller 62. At this time, an upward force is applied to the roller 61 at the nip by the roller 61 being pressed to be deformed along the shape of the roller 62, so that, at the nip, the path 64 having not been pressed is shortened to the path 65 having been pressed. Thus, the nip of the roller 61 is shrunk in the circumferential direction, so that stress distribution occurs in the travel direction, as shown by the in-plane stresses 66. As a result, in the roller 61, the peripheral speed of the nip is different from the peripheral speed of a part other than the nip. In order to accurately calculate deformation that occurs when the two rollers travel with being pressed against each other, pressing the rollers against each other and the travel of the rollers need to be calculated as the movement of finite elements.

Thus, it can be understood that, in general, in order to obtain the states of deformation of paper and components surrounding the paper when the paper is conveyed by structural calculation, the paper needs to be actually conveyed to observe the states of deformation of the paper and the components surrounding the paper at each time step. However, in the transfer process apparatus, since the diameters of the rollers are sufficiently large, unlike the situation shown in FIG. 13, the difference between the path having not been pressed and the path having been pressed is very small, and thus difference in the peripheral speed in the travel direction that occurs at the nip can be disregarded. Accordingly, structural calculation in which the rotation of the rollers, the components surrounding the paper sandwiching the paper at the front surface and back surface thereof, is disregarded and only pressing the rollers against each other is considered, as shown in FIG. 14, can be adopted.

In this arrangement, the states of deformation of paper and components surrounding the paper can be obtained without performing calculation of conveyance of paper in which finite elements are moved. Thus, mapping between finite elements for electric field calculation and finite elements for structural calculation can be performed.

Figure 2:
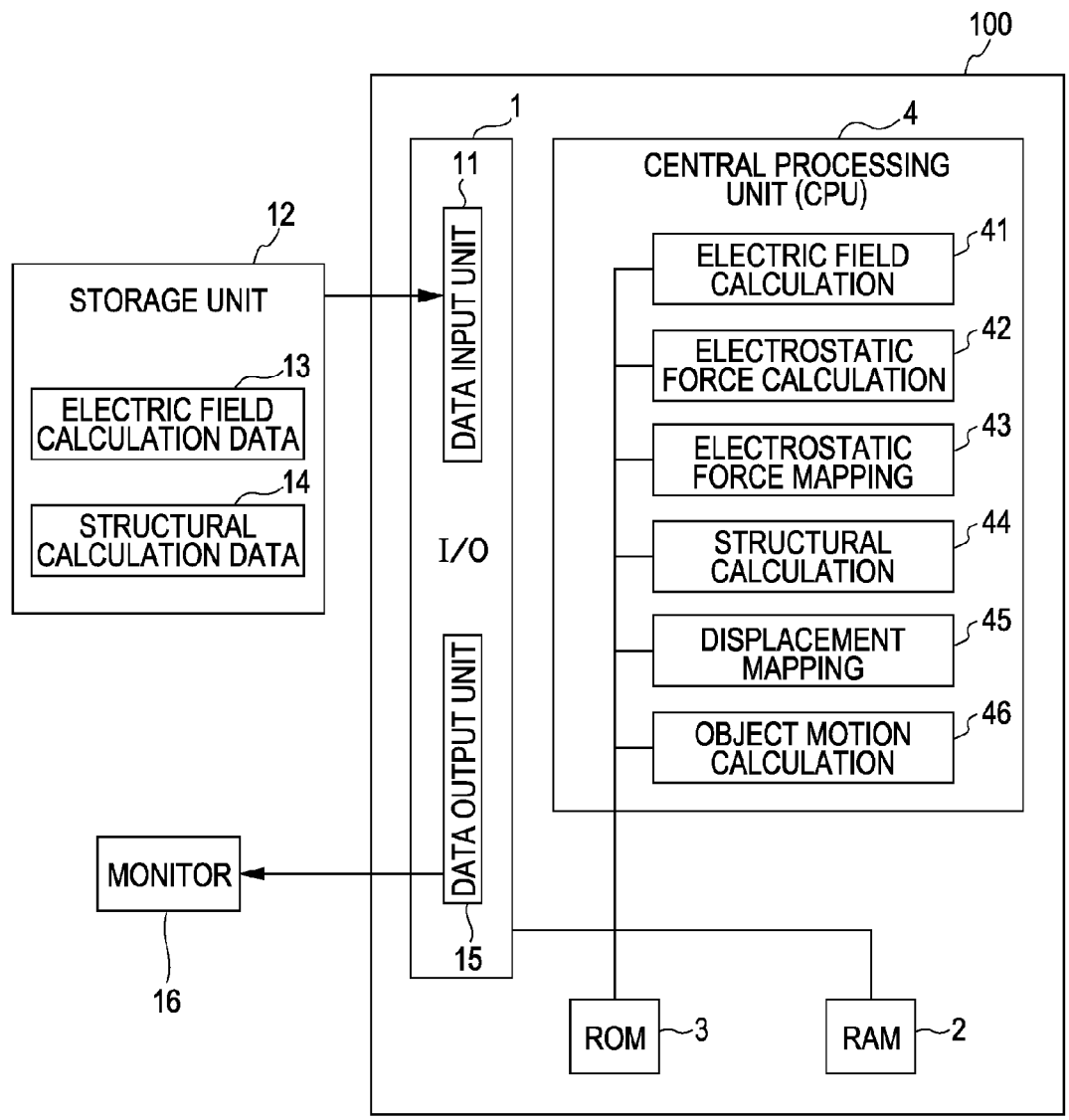
FIG. 2 shows the components of the analysis apparatus in the exemplary embodiment.
Figure 3:
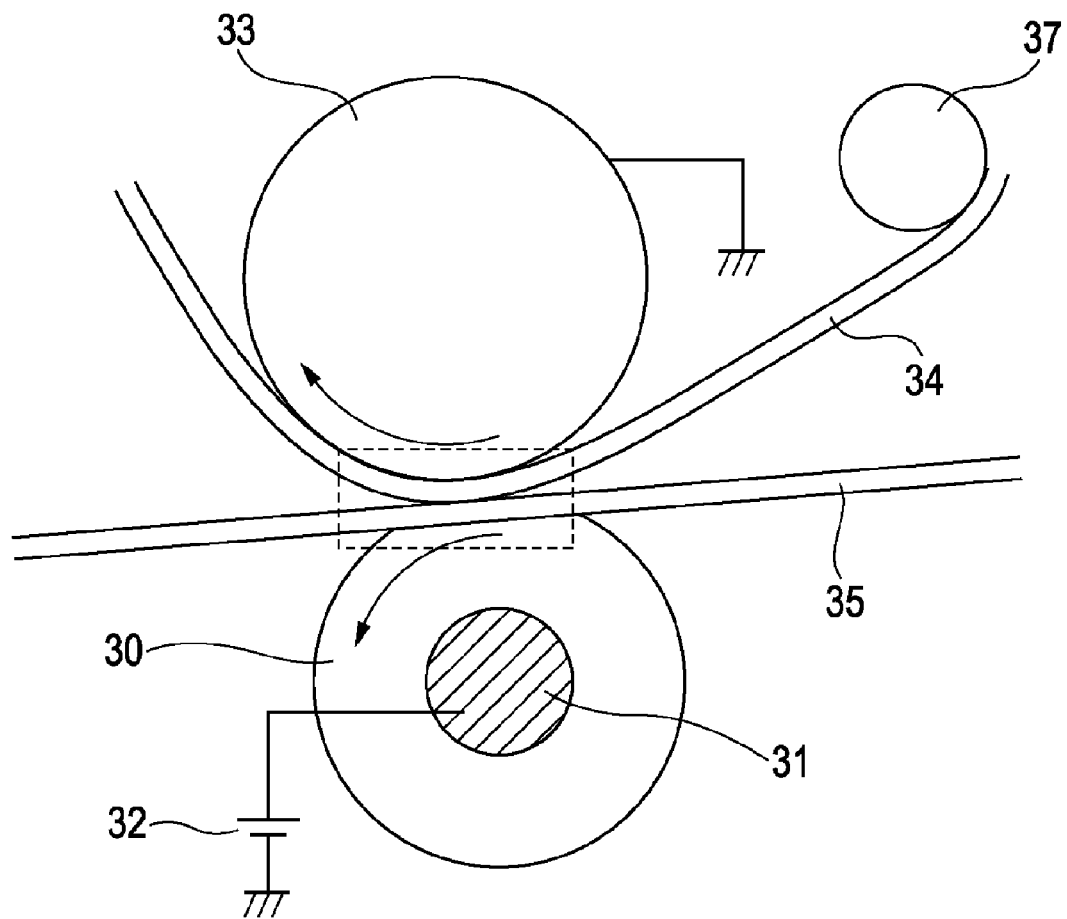
FIG. 3 shows an example of a conventional transfer process apparatus.
Figure 4:
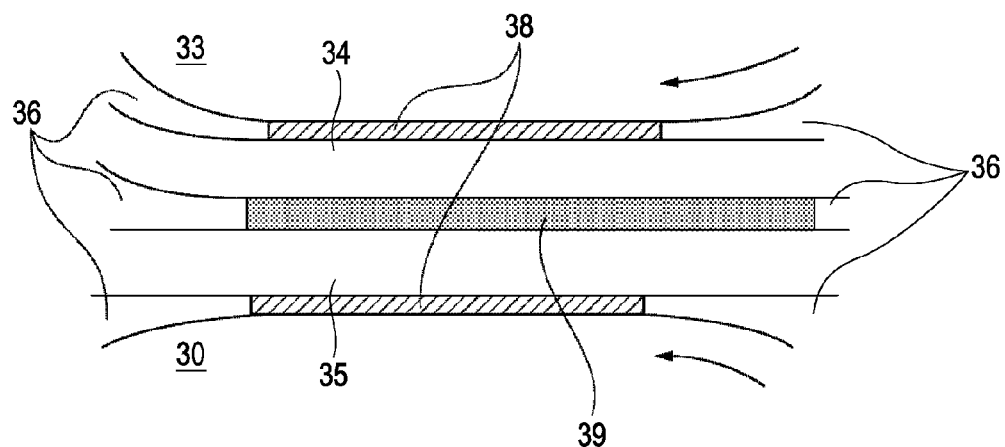
FIG. 4 is an enlarged diagram showing a nip of a model for electric field calculation of the transfer process apparatus.

The components and operation of the analysis apparatus, which analyzes transfer process apparatus models, in the exemplary embodiment will now be described. FIG. 2 shows the components of the analysis apparatus in the exemplary embodiment.

In FIG. 2, a computer 100 is the analysis apparatus. An input/output circuit (I/O) 1 includes a data input unit 11 and a data output unit 15. The data input unit 11 reads input data stored in a storage unit 12. The data output unit 15 outputs output data as the result of processing to a monitor 16. Electric field calculation data 13 and structural calculation data 14 are stored in the storage unit 12 as the input data.

The electric field calculation data 13 includes data about a mesh model for electric field calculation, the physical property values (the relative permittivity and conductivity) of a dielectric, and the conditions of electric potential boundaries. The structural calculation data 14 includes data about a model that is divided into finite elements used in structural calculation, the physical property values (the Young's moduli and Poisson's ratios) of member models, and structural boundaries. The output data output to the monitor 16 includes data on the result of deformation that is the result of analysis and the data of electric potential distribution.

A random access memory (RAM) 2 temporarily stores the input data and the output data. A read only memory (ROM) 3 is a computer-readable memory that stores processing programs for implementing the exemplary embodiment.

A central processing unit (CPU) 4 performs individual processes using the respective processing programs. Specifically, the CPU 4 performs electric field calculation 41, electrostatic force calculation 42, electrostatic force mapping 43, structural calculation 44, displacement mapping 45, and object motion calculation 46.

In the electric field calculation 41, the CPU 4 obtains the respective electric potentials of nodes on the basis of the placement of a dielectric and an electric conductor, the relative permittivity, and the conductivity, considering charge transfer due to energization and charge transfer due to discharge. A node represents a point of intersection of boundary areas of divided elements. In the electric field calculation unit 41, the position of charge carriers carried by a paper model and the amount of charge are calculated for each time step.

In the electrostatic force calculation 42, the CPU 4 calculates the electrostatic force at each node on a surface of a dielectric from the amount of charge obtained in electric field calculation.

In the electrostatic force mapping 43, the CPU 4 performs mapping of the electrostatic force data from a transfer process apparatus model used in electric field calculation to a transfer process apparatus model used in structural calculation.

In the structural calculation 44, the CPU 4 calculates the amount of displacement of each node in the transfer process apparatus model used in structural calculation, on the basis of the positions and structure property values such as elastic moduli of member models, constraints, and loading conditions as input data. In other words, the CPU 4 calculates the displacement of the shape of a paper model.

In the process in the displacement mapping unit 45, the CPU 4 performs mapping of the data of the displacement of the shape of the paper model from the transfer process apparatus model used in structural calculation to the transfer process apparatus model used in electric field calculation. Then, the CPU 4 adds each of the calculated amounts of displacement to the data of the coordinates of a corresponding node in the transfer process apparatus model used in electric field calculation. In other words, the displacement of the shape of the paper model calculated in structural calculation is reflected in the transfer process apparatus model used in electric field calculation.

In the process of the object motion calculation unit 46, the CPU 4 moves charge models in a direction in which the paper model needs to be conveyed as the simulation of moving the paper model.

In this case, in electric field calculation and structural calculation, a mathematical calculation method based on a discretization method, for example, a finite element method or a difference method, is used. When unique data is necessary, the data is added to the input data stored in the storage unit 12, using, for example, a mass-spring model method in structural calculation.

An example in which a finite element method is used is described here. Alternatively, a difference method or a mass-spring model method may be used, as described above.

Figure 1:
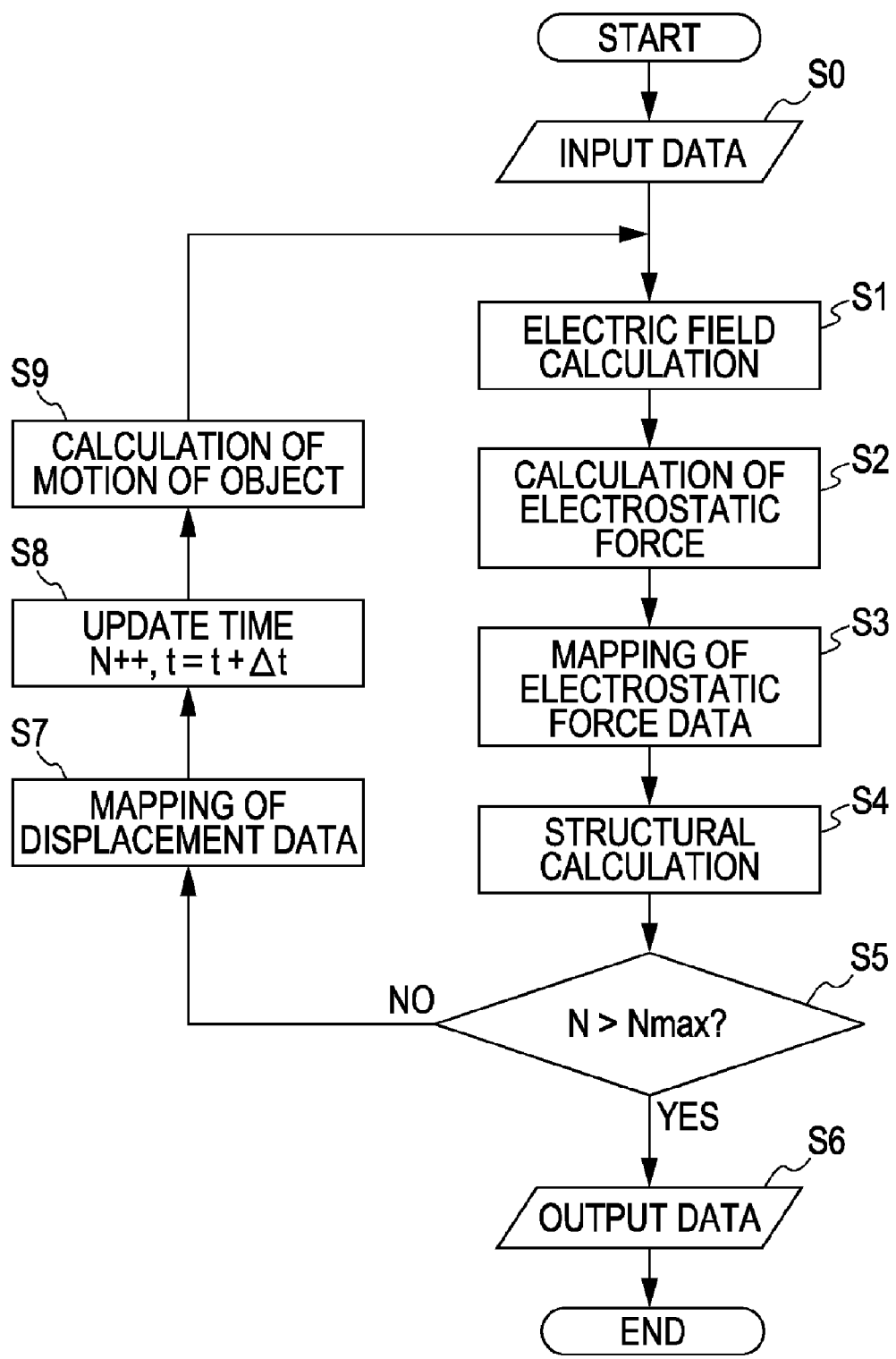
FIG. 1 is a flowchart of process in an analysis apparatus in an exemplary embodiment of the present invention.

FIG. 1 is a flowchart of a process in the analysis apparatus in the exemplary embodiment. The CPU 4 performs the process shown in FIG. 1 using the processing programs stored in the ROM 3.

In step S0, the CPU 4 first reads input data from the storage unit 12 via the data input unit 11 and stores the input data in the RAM 2. The input data includes the electric field calculation data 13 and the structural calculation data 14. The electric field calculation data 13 includes a model of a transfer process apparatus used in electric field calculation, the model being divided into finite elements, the permittivity of a dielectric, the conductivity of an electric conductor, specification of nodes in the mesh model, the respective electric potentials of the nodes being fixed, the respective values of the fixed electric potentials, charge on boundaries, a time interval, and the number of calculation steps.

The model of the transfer process apparatus used in electric field calculation, the model being divided into finite elements, includes information on the total number $N_{electric\ field}$, of nodes each of which is a point of intersection of boundary areas of divided elements, the coordinates ($x_{electric\ field}i$, $y_{electric\ field}i$) of the nodes, the number $n_{electric\ field}$, of nodes, and node numbers. The model of the transfer process apparatus used in electric field calculation, the model being divided into finite elements, is created on the basis of information on the placement of objects to be analyzed, the objects including a dielectric, air, a resistive layer, a transfer belt, and a sheet dielectric such as a soft medium. A resistive layer is a group of elements inserted into a contact portion between a sheet dielectric and an adjacent dielectric and enables calculation of charge transfer between the two dielectrics.

A model of a transfer process apparatus used in structural calculation, the model being divided into finite elements, includes information on the total number $N_{structure}$, of nodes each of which is a point of intersection of boundary areas of divided elements, the coordinates ($x_{structure}i$, $y_{structure}i$) of the nodes, the number $n_{structure}$, of nodes, and node numbers. The model of the transfer process apparatus used in structural calculation, the model being divided into finite elements, is created on the basis of information on the placement of members to be analyzed.

In step S1, the CPU 4 performs the electric field calculation 41. In this case, charge transfer in an electric conductor and charge transfer due to discharge in air are considered. In the paper model 35, in order to express conveyance of the paper model 35, it is assumed that the material of the area 74, which is not hatched, is air, as shown in FIG. 7. In step S1, the CPU 4 stores the respective obtained electric potentials of nodes and the amount of charge in the RAM 2.

In step S2, an electrostatic force exerted on the paper model 35 is calculated. An electrostatic force Tj per unit area exerted on a position (node) j in the paper model 35 is obtained by the following equation:

$$Tj=(\sigma A+\sigma B)(E\alpha+E\beta)/4,$$

where σA and σB are respectively charge densities on the front surface and back surface of the paper model 35 at the position j, and Eα and Eβ are respectively electric field intensities on the front surface and back surface of an medium.

The electrostatic force Tj is calculated on the basis of this equation, using data on the charge density and electric field intensity on each node in the transfer process apparatus model used in electric field calculation stored in the RAM 2, and is stored in the RAM 2.

In step S3, the CPU 4 performs mapping of the electrostatic force data from the model of the transfer process apparatus used in electric field calculation, the model being divided into finite elements, to the model of the transfer process apparatus used in structural calculation, the model being divided into finite elements. Specifically, the CPU 4 projects an electrostatic force ($Tx_{electric\ field}$, $Ty_{electric\ field}$) in each element in the model used in electric field calculation onto a corresponding position in the model used in structural calculation, and the data is replaced to be a load ($Fx_{structure}$, $Fy_{structure}$). Then, the replaced data is stored in the RAM 2.

In step S4, the CPU 4 performs the structural calculation 44. The displacement of the shape of the paper model 35 is calculated on the basis of the elastic moduli, Poisson's ratios, and positions of member models, the loading conditions of nodes, and constraints. Furthermore, the displacements of the shapes of, for example, the transfer roller 30 and the transfer belt 34, which are components surrounding the paper model 35, are calculated on the basis of these conditions. In order to express conveyance of the paper model 35, it is assumed that an area to which no electrostatic force is applied (the area 74, which is not hatched) is an air area, as shown in FIG. 8. In this case, the deformation of the roller models 30 and 33 and the deformation of the paper model 35 are calculated at the same time, using the method for pressing shown in FIG. 14. Thus, the deformation of a paper model can be calculated, considering the deformation of roller models. The CPU 4 stores the calculated amount of displacement of each node in the RAM 2.

In step S5, the CPU 4 determines whether a predetermined number of calculation steps have been completed. When the CPU 4 determines that the predetermined number of calculation steps have not been completed, the process proceeds to step S7. In step S7, mapping of information on the displacement of each node calculated in step S4 to a corresponding node in the model used in electric field calculation is performed. Then, in step S8, simulation time is updated. Then, in step S9, charge models are moved to incorporate the movement of the object.

On the other hand, when the CPU 4 determines in step S5 that the predetermined number of calculation steps have been completed, the process proceeds to step S6. In step S6, information on the transfer process apparatus model, the electric potential of each node, and charge is output to the monitor 16 via the data output unit 15.

In step S7, the CPU 4 performs mapping of the displacement data obtained by structural calculation to the transfer process apparatus model used in electric field calculation. Specifically, the CPU 4 projects the displacement ($\Delta x_{structure}$, $\Delta y_{structure}$) of each node in the transfer process apparatus model used in structural calculation stored in the RAM 2 onto a corresponding node in the transfer process apparatus model used in electric field calculation. Then, the projected displacement is added to the current coordinates ($x_{electric\ field}$, $y_{electric\ field}$), and the result is stored in the RAM 2. In this case, the amount of displacement represents the amount of change of the position of a node from the last structural calculation.

In step S9, in electric field calculation, the CPU 4 moves the charge models to a position to which the paper model is moved in accordance with the simulation time. That is to say, charge carriers carried by individual member models including the paper model in the transfer process apparatus model used in electric field calculation stored in the RAM 2 are moved in respective directions in which the members are moved, and the moved charge carriers are stored in the RAM 2. In step S9, the charge carriers carried by the paper model are moved in the conveying direction, so that conveyance of paper is expressed, as described above.

The exemplary embodiment has been described in detail. The following three advantageous effects have been achieved.

A transfer process apparatus model can be calculated, without redividing the transfer process apparatus model, by expressing conveyance of paper as the movement of charge carriers carried by the paper.

Mapping between a mesh for electric field calculation and a mesh for structural calculation can be performed, using a paper model in which an area expected to be conveyed is set.

Mapping between a mesh for electric field calculation and a mesh for structural calculation can be performed by performing calculation in which pressing, using an element of a roller that is a pressing member, is performed only by applying a load to the roller or displacing the roller in the opposite direction, without the element of the roller being rotated.

The analysis apparatus in the exemplary embodiment is applied to weak coupling in structural calculation and electric field calculation. Instead of electric field calculation, the analysis apparatus in the exemplary embodiment may be applied to field calculation, for example, magnetic field calculation or fluid calculation.

Exemplary results of actually performing electric field calculation for a transfer process apparatus model, using the analysis apparatus in the exemplary embodiment, will now be described.

Figure 9:
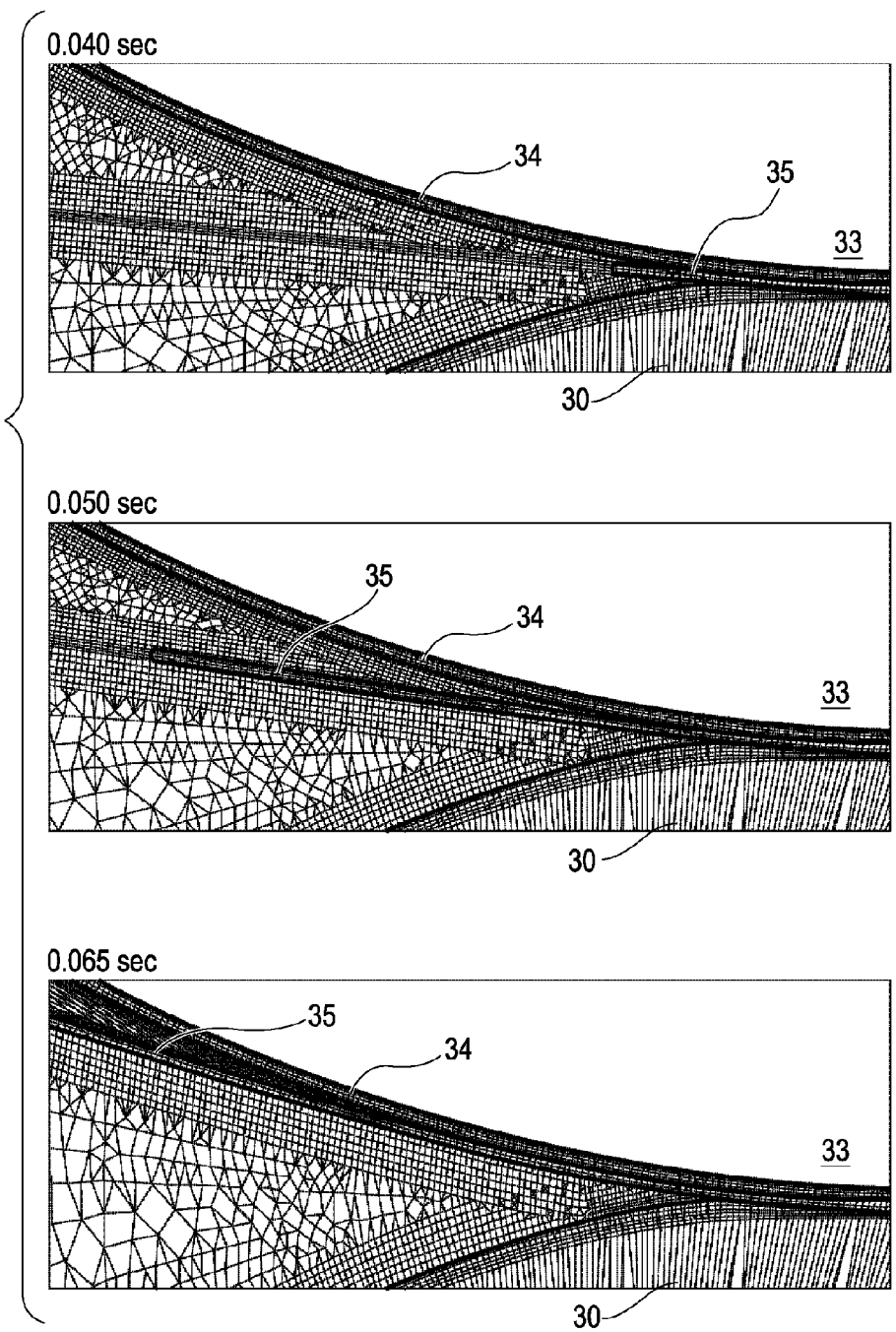
FIG. 9 shows the results of calculation in the case of failure in separation of paper.

The results of calculation in a case where failure in separation of paper occurs will first be described. Failure in separation of paper is a phenomenon in which paper is charged in a transfer portion to stick to a roller, so that paper ejection fails. FIG. 9 shows the results of calculation in a case where failure in separation of paper occurs at the downstream portion. The top row of FIG. 9 shows the state reached after 0.04, seconds have elapsed. The middle row of FIG. 9 shows the state reached after 0.05, seconds have elapsed. The bottom row of FIG. 9 shows the state reached after 0.065, seconds have elapsed. Since reference numerals shown in FIG. 9 denote the same models as in FIG. 5, the description of the models is omitted. In FIG. 9, thin lines represent finite elements, and thick lines represent the contours of object models. When the time is updated, the leading end of the paper model is moved toward the left. In this case, a mesh is not redivided, but the movement of the paper model is expressed as the movement of charge carriers.

Over time, the paper model 35 is subjected to discharge from the transfer roller model 30 to be positively charged and attracted toward the transfer belt 34, as shown in FIG. 9. This state is the same as the state of an actual apparatus, and failure in separation of paper at the downstream portion can be accurately replicated by obtaining solutions to equations in electric field calculation and structural calculation, using the method in the exemplary embodiment.

Figures 10, 11:
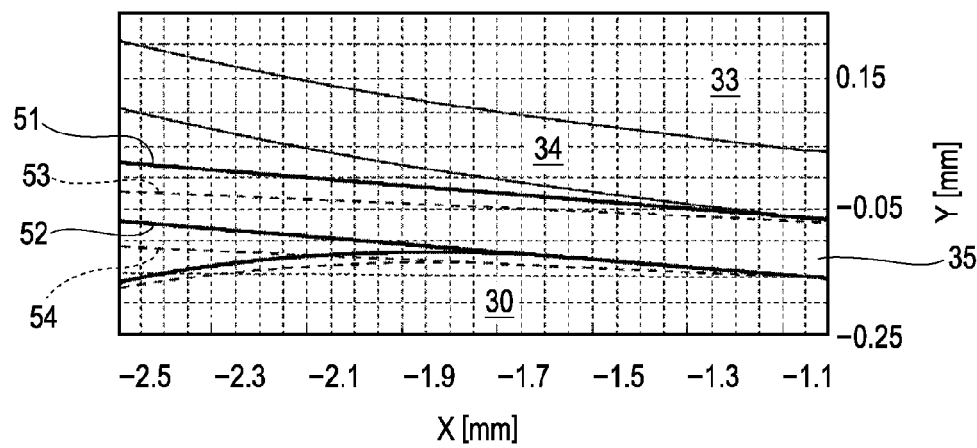
FIG. 10 shows the results of calculation in an area that includes a nip at a downstream portion and the neighborhood of the nip.
FIG. 11 is a table showing the results of calculation for checking discharge at the downstream portion.

The results of calculation in a case where image defects occur will next be described. FIG. 10 shows the results of calculation in an area that includes the nip at the downstream portion and the neighborhood of the nip at certain time. Lines represent the contours of members related to the transfer process. Solid lines represent the result of calculation according to the known method, in which the electrostatic force is not considered, and broken lines represent the result of calculation according to the method in the exemplary embodiment.

In FIG. 10, calculation for a front surface 51 and a back surface 52 of paper is performed by the known method, and calculation for a front surface 53 and a back surface 54 of paper is performed by the method according to the exemplary embodiment. In the calculation according to the exemplary embodiment, the deformation of rollers is also considered.

The results of calculation show that the paper model 35 is about 50, μm closer to the transfer roller model 30 at a position of −2.5, mm in the X direction due to the electrostatic force, and thus separation between the transfer belt 34 and the paper 35 starts early, and separation between the paper 35 and the transfer roller 30 is delayed.

FIG. 11 is a table showing the results of calculation for checking the presence or absence of abnormal discharge that occurs between the transfer belt model 34 and the paper model 35 in the situation shown in FIG. 10. In a case A, a standard transfer roller is used. In a case B, a low resistance transfer roller is used. In the known calculation method, abnormal discharge does not occur in both the cases A and B. In contrast, in the calculation method according to the exemplary embodiment, abnormal discharge does not occur in the case A but occurs in the case B. On the other hand, regarding an image transferred to paper obtained by experiment, in the case A, unevenness in the image due to abnormal discharge does not occur, and thus the quality of the image is satisfactory. In the case B, unevenness in the image due to abnormal discharge occurs, and thus the quality of the image is unsatisfactory. This examination shows that, in the method in the exemplary embodiment, image defects due to abnormal discharge at the downstream portion can be predicted by calculation.

In an actual transfer process apparatus, since a transfer roller, a counter roller, and a transfer belt that are component members exhibit resistance, after an electric field applied to these component members becomes stable (after warming-up is completed), paper is input. A method in which warming-up is performed to enable analysis under the same conditions as in an actual apparatus will next be described.

The CPU 4 in FIG. 2 determines whether the simulation time falls within warming-up time.

Figure 12:
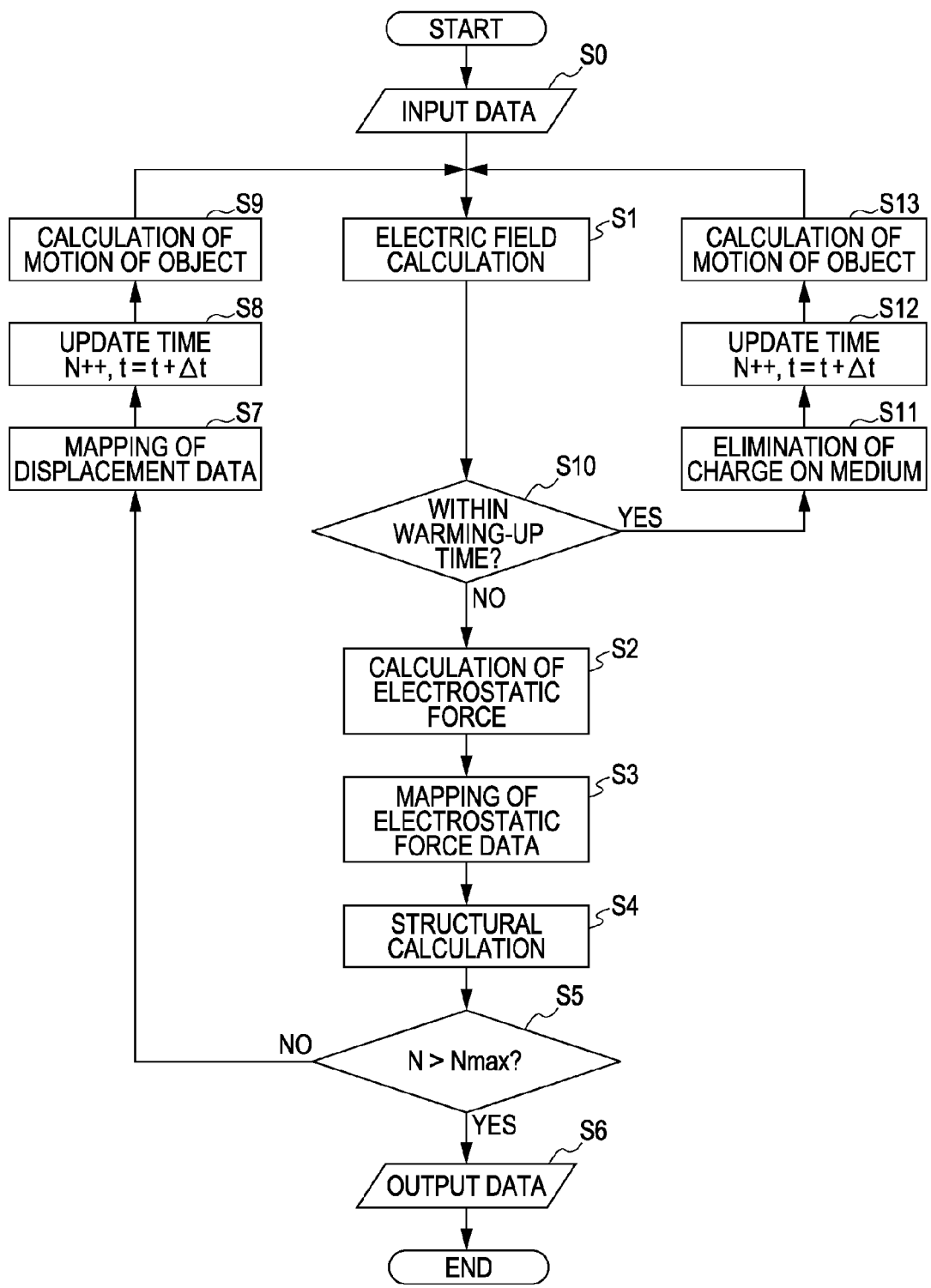
FIG. 12 is a flowchart of a simulation operation in which warming-up is considered in the exemplary embodiment.

FIG. 12 is a flowchart of an analysis process in the analysis apparatus in the exemplary embodiment in which warming-up time is considered. The CPU 4 performs individual processes in FIG. 12 using respective programs stored in the ROM 3.

Since steps S0 to S9 are the same and/or similar as those described in FIG. 1, the description is omitted. In step S10, it is determined whether warming-up time has elapsed. When it is determined that the warming-up time has not elapsed, the process proceeds to step S11. In step S11, charge accumulated in a medium of a mesh for electric field calculation is eliminated. Then, in step S12, the simulation time is updated. Then, in step S13, the motion of an object is calculated as in step S9. In this arrangement, discharge and charge injection are not performed on the medium, and the movement of charge carriers accompanying conveyance of the medium is not considered. Thus, a state in which paper is not input can be maintained. Then, the process returns to step S1 where electric field calculation is performed.

On the other hand, it is determined in step S10 that the warming-up time has elapsed, the process proceeds to step S2. In step S2, the electrostatic force is calculated. Then, steps S3 and S4 are performed as in FIG. 1. After the warming-up time has elapsed, discharge and charge injection are performed on the medium, and the movement of charge carriers accompanying conveyance of the medium is considered.

In the exemplary embodiment, an accurate result of calculation in which warming-up of an apparatus is considered as in an actual apparatus can be obtained.

While the present invention has been described with reference to exemplary embodiments, it is to be understood that the invention is not limited to the disclosed exemplary embodiments. For example, the invention may be implemented on a non-transitory computer-readable medium containing computer-executable instructions for executing an analysis method utilized in an analysis apparatus. Moreover, the scope of the following claims is to be accorded the broadest interpretation so as to encompass all modifications and equivalent structures and functions.

This application claims the benefit of Japanese Application No. 2007-277585, filed Oct. 25, 2007,, which is hereby incorporated by reference herein in its entirety.

What is claimed is:

1. An analysis apparatus comprising:
   an element division unit configured to position, within an area in which a model of a soft medium is moved, a member model including the model of the soft medium and divide the positioned member into a plurality of elements; and
   a calculation unit configured to calculate a shape of the model of the soft medium in response to an update of simulation time,
   wherein the calculation unit calculates the shape of the model of the soft medium by separating the plurality of elements into elements corresponding to a position of the model of the soft medium treated as an area in which charge exists and elements corresponding to a position excluding the model of the soft medium and treated as an air area at a first simulation time,
   wherein the calculation unit further calculates the shape of the model of the soft medium by separating the plurality of elements into elements corresponding to a position of the model of the soft medium treated as an area in which charge exists and elements corresponding to a position excluding the model of the soft medium and treated as an air area at a second simulation time,
   the second simulation time being an updated time which follows the first simulation time, and being set so that the position of the model of the soft medium at the second simulation time is different from the position of the model of the soft medium at the first simulation time.

2. The analysis apparatus according to claim 1, wherein, in response to an update of the simulation time, the calculation unit performs, together with the calculation of the shape of the model of the soft medium, calculation of deformation caused by pressing, against the soft medium, respective elements of members that sandwich the model of the soft medium at the same position.

3. The analysis apparatus according to claim 2, wherein the calculation unit calculates a field in each of the elements obtained by the element division unit and calculates the shape of the model of the soft medium, which has been moved, on the basis of the respective calculated fields of the elements.

4. The analysis apparatus according to claim 3, wherein the calculation unit calculates the shape of the model of the soft medium, which is moved in a transfer process apparatus model that transfers particles to the model of the soft medium.

5. The analysis apparatus according to claim 4, wherein, in response to an update of the simulation time, the calculation unit moves charge carriers carried by the model of the soft medium to positions of the individual elements, to which the soft medium is to be conveyed, and calculates the shape of the model of the soft medium on the basis of forces of the moved charge carriers generated at the positions of the individual elements.

6. The analysis apparatus according to claim 5, wherein the calculation unit determines whether the simulation time falls within warming-up time and does not perform movement of charge carriers accompanying conveyance of a medium in the warming-up time.

7. The analysis apparatus according to claim 1, wherein the element division unit sets the area divided into the elements so that a geometric shape of the area coincides with a geometric shape of a model of the soft medium used in structural calculation, the model being divided into finite elements.

8. An analysis method utilized in an analysis apparatus comprising the steps of:
   positioning, within an area in which a model of a soft medium is moved, a member model including the model of the soft medium and divide the positioned member into a plurality of elements; and
   calculating a shape of the model of the soft medium in response to an update of simulation time,
   wherein the calculating step further includes calculating the shape of the model of the soft medium by separating the plurality of elements into elements corresponding to a position of the model of the soft medium treated as an area in which charge exists and elements corresponding to a position excluding the model of the soft medium and treated as an air area at a first simulation time,
   wherein the calculating steps further includes calculating the shape of the model of the soft medium by separating the plurality of elements into elements corresponding to a position of the model of the soft medium treated as an area in which charge exists and elements corresponding to a position excluding the model of the soft medium and treated as an air area at a second simulation time,
   the second simulation time being an updated time which follows the first simulation time, and being set so that the position of the model of the soft medium at the second simulation time is different from the position of the model of the soft medium at the first simulation time.

9. The analysis method according to claim 8, wherein, in step c), deformation caused by pressing, against the soft medium, respective elements of members that sandwich the model of the soft medium at the same position, together with the shape of the model of the soft medium, is calculated.

10. The analysis method according to claim 9, wherein, in step c), a field is calculated at a position of each of the elements, and
    the shape of the model of the soft medium, which has been moved, is calculated on the basis of the respective calculated fields of the positions of the elements.

11. The analysis method according to claim 10, wherein, in step c), in response to an update of the simulation time, charge carriers carried by the model of the soft medium are moved to the position, to which the soft medium is to be conveyed, and
    the shape of the model of the soft medium is calculated on the basis of forces of the moved charge carriers generated at the individual positions.

12. The analysis method according to claim 8, wherein, in step c), the area divided into the elements for the model of the soft medium is set so that a geometric shape of the area coincides with a geometric shape of the model of the soft medium.

13. The analysis method according to claim 8, wherein, in step c), in warming-up time, movement of charge carriers accompanying conveyance of a medium is not performed.

14. A non-transitory computer-readable medium containing computer-executable instructions for executing an analysis method utilized in an analysis apparatus, the medium comprising:
    computer-executable instructions for positioning, within an area in which a model of a soft medium is moved, a member model including the model of the soft medium and divide the positioned member into a plurality of elements; and
    computer-executable instructions for calculating a shape of the model of the soft medium in response to an update of simulation time,
    wherein the computer-executable instructions for calculating further includes calculating the shape of the model of the soft medium by separating the plurality of elements into elements corresponding to a position of the model of the soft medium treated as an area in which charge exists and elements corresponding to a position excluding the model of the soft medium and treated as an air area at a first simulation time, wherein the computer-executable instructions for calculating further includes calculating the shape of the model of the soft medium by separating the plurality of elements into elements corresponding to a position of the model of the soft medium treated as an area in which charge exists and elements corresponding to a position excluding the model of the soft medium and treated as an air area at a second simulation time, the second simulation time being an updated time which follows the first simulation time, and being set so that the position of the model of the soft medium at the second simulation time is different from the position of the model of the soft medium at the first simulation time.

15. An analysis apparatus comprising:

an element division unit configured to divide, into a plurality of elements, an area in which a model of a soft medium is moved; and a calculation unit configured to calculate a shape of the model of the soft medium in response to an update of simulation time, wherein the calculation unit shifts parameters about the model of the soft medium to elements at a position to which the model of the soft medium is to be conveyed, from the elements generated by the element division unit, and calculates the shape of the model of the soft medium at the simulation time after shifting the parameters, wherein, in response to an update of the simulation time, the calculation unit performs, together with the calculation of the shape of the model of the soft medium, calculation of deformation caused by pressing, against the soft medium, respective elements of members that sandwich the model of the soft medium at the same position, wherein the calculation unit calculates a field in each of the elements obtained by the element division unit and calculates the shape of the model of the soft medium, which has been moved, on the basis of the respective calculated fields of the elements, wherein the calculation unit calculates the shape of the model of the soft medium, which is moved in a transfer process apparatus model that transfers particles to the model of the soft medium, wherein, in response to an update of the simulation time, the calculation unit moves charge carriers carried by the model of the soft medium to positions of the individual elements, to which the soft medium is to be conveyed, and calculates the shape of the model of the soft medium on the basis of forces of the moved charge carriers generated at the positions of the individual elements, wherein the calculation unit determines whether the simulation time falls within warming-up time and does not perform movement of charge carriers accompanying conveyance of a medium in the warming-up time.

16. An analysis method utilized in an analysis apparatus comprising the steps of:

a) dividing, into a plurality of elements, an area in which a model of a soft medium is moved;

b) shifting, in response to an update of simulation time, parameters about the model of the soft medium to elements at a position to which the soft medium is to be conveyed; and c) calculating a shape of the model of the soft medium after shifting the parameters, wherein, in step c), in warming-up time, movement of charge carriers accompanying conveyance of a medium is not performed.

17. A non-transitory computer-readable medium containing computer-executable instructions for executing an analysis method utilized in an analysis apparatus, the medium comprising:

computer-executable instructions for dividing, into a plurality of elements, an area in which a model of a soft medium is moved;

computer-executable instructions for shifting, in response to an update of simulation time, parameters about the model of the soft medium to elements at a position to which the soft medium is to be conveyed; and computer-executable instructions for calculating a shape of the model of the soft medium after shifting the parameters, wherein in warming-up time, movement of charge carriers accompanying conveyance of a medium is not performed.

* * * * *